United States Patent
Kim et al.

(10) Patent No.: US 11,347,504 B2
(45) Date of Patent: May 31, 2022

(54) MEMORY MANAGEMENT METHOD AND APPARATUS FOR PROCESSING-IN-MEMORY

(71) Applicant: Korea Electronics Technology Institute, Seongnam-si (KR)

(72) Inventors: Byung Soo Kim, Yongin-si (KR); Young Jong Jang, Yongin-si (KR); Young Kyu Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/137,003

(22) Filed: Dec. 29, 2020

(65) Prior Publication Data
US 2022/0012054 A1    Jan. 13, 2022

Related U.S. Application Data

(63) Continuation of application No. PCT/KR2020/009163, filed on Jul. 13, 2020.

(30) Foreign Application Priority Data

Jul. 10, 2020   (KR) ........................ 10-2020-0085573

(51) Int. Cl.
  *G06F 9/30*   (2018.01)
  *G06F 9/38*   (2018.01)
  *G06F 9/448*   (2018.01)

(52) U.S. Cl.
  CPC ........ *G06F 9/3004* (2013.01); *G06F 9/30145* (2013.01); *G06F 9/3824* (2013.01); *G06F 9/4498* (2018.02)

(58) Field of Classification Search
  CPC .. G06F 9/3004; G06F 9/4498; G06F 9/30145; G06F 9/3824
  See application file for complete search history.

(56) References Cited

U.S. PATENT DOCUMENTS 6,321,296 B1 * 11/2001 Pescatore ............ G06F 12/0811
                                                  711/117
7,124,260 B2 * 10/2006 LaBerge ................. G11C 7/12
                                                  711/155

(Continued)

OTHER PUBLICATIONS

Ma et al.; A DRAM Precharge Policy Based on Address Analysis; 2007; IEEE.*

(Continued)

*Primary Examiner* — Corey S Faherty
(74) *Attorney, Agent, or Firm* — Knobbe Martens Olson & Bear LLP

(57) ABSTRACT

This application relates to a memory management method for maximizing processing-in-memory (PIM) performance and reducing unnecessary DRAM access time. In one aspect, when processing a PIM instruction packet, an instruction processing unit secondarily processes a request for access to a destination address at which read and write actions of an internal memory are likely to be sequentially performed. By secondarily requesting the destination address, a row address of an open page of the internal memory may match a row address to which a PIM instruction packet processing result is written back. Also, the instruction processing unit inside the PIM maintains memory write and read addresses that have previously requested. The instruction processing unit compares the address of a packet to be processed to the maintained previous memory address and informs a memory controller about the comparison result through a page closing signal.

4 Claims, 7 Drawing Sheets

(56) References Cited

U.S. PATENT DOCUMENTS

| | | | | |
|---|---|---|---|---|
| 7,624,238 B2* | 11/2009 | Miura | ................ | G11C 7/1018 |
| | | | | 711/154 |
| 8,045,413 B2* | 10/2011 | Demone | ................ | G11C 7/22 |
| | | | | 365/222 |
| 2020/0233795 A1* | 7/2020 | Park | ...................... | G06F 12/02 |

OTHER PUBLICATIONS

Natarajan et al.; A Study of Performance Impact of Memory Controller Features in Multi-Processor Server Environment; 2004; ACM.*

Goossens et al.; Conservative Open-Page Policy for Mixed Time-Criticality Memory Controllers; 2013; EDAA.*

\* cited by examiner

MEMORY MANAGEMENT METHOD AND APPARATUS FOR PROCESSING-IN-MEMORY

CROSS REFERENCE TO RELATED APPLICATIONS

This is a continuation application of International Patent Application No. PCT/KR2020/009163, filed on Jul. 13, 2020, which claims priority to Korean Patent Application No. 10-2020-0085573 filed on Jul. 10, 2020, contents of both of which are incorporated herein by reference in their entireties.

BACKGROUND

Technical Field

The described technology relates to a processing-in-memory (PIM), and more specifically, to a memory controller inside a PIM unit. In particular, the described technology relates to a memory management method for minimizing a transaction time of a memory inside a PIM and a hardware structure of a PIM for the memory control method.

Description of Related Technologies

A processing-in-memory (PIM) is a memory integrated with a processing unit as one chip and improves system performance and power efficiency by reducing the frequency with which a processor accesses the memory to perform operations Unlike the traditional memory approach, the PIM approach uses instruction signals for operation in addition to using the address and data signals. The processing tout of the PIM processes tut instruction received from a processor and thus has complicated hardware. Accordingly, the memory performance of the PIM may be degraded. Therefore, since the memory performance of the PIM should not be significantly degraded, the processing unit requires as low hardware complexity as possible and thus is designed to support only relatively simple operations, for PIM, a variety of memories (e.g., dynamic random access memory (DRAM)) may be used as a memory element.

SUMMARY

One aspect is a memory management method for maximizing processing-in-memory (PIM) performance and is directed to improving PIM performance by reducing PIM's unnecessary time to access DRAM.

In some embodiments, by changing the processing order of memory addresses explicitly or implicitly included in PIM instructions (or PIM operations), it is possible to improve the open page hit rate of the internal memory (e.g., DRAM). To this end, when processing a PIM instruction packet, an instruction processing unit secondarily processes a request for access to a destination address at which read and write actions of an internal memory are likely to be sequentially performed. By secondarily requesting the destination address, a row address of an open page of the internal memory may match a row address to which a PIM instruction packet processing result is written back.

Also, according to the described technology, by the instruction processing unit pre-determining memory addresses explicitly or implicitly included in the PIM instruction and informing a memory controller of the memory addresses, it is possible to minimize performance loss that has occurred in an open-page miss situation of the internal memory. To this end, the instruction processing unit inside the PIM maintains memory write and read addresses that base been previously requested. The instruction processing unit compares the address of a packet to be processed to the maintained previous memory address and informs a memory controller about the comparison result through a page closing signal. The memory controller determines whether to maintain or close the page of the internal memory through this page closing signal.

The detailed configuration and interaction of the described technology will become more apparent through specific embodiments described below with reference to the drawings.

According to the described technology, by changing the processing order of memory addresses explicitly and implicitly included in PIM instructions (or PIM operations), it is possible to improve the open page hit rate of the DRAM.

According to the described technology, it is possible to reduce performance loss due to page miss having occurred when the management of the DRAM inside the PIM is operated in open-page mode.

DETAILED DESCRIPTION

In the case of DRAM, due to a unique action scheme different from those of other conventional memories, a required memory transaction time vanes greatly depending on the management method. In traditional computer systems, system performance has been improved through various memory management methods using open-page mode and close-page mode. Recently, computer systems of various structures have been developed due to social demands, and each computer system employs various memory scheduling methods that meet requirements. However, PIM is a computer structure that is newly studied to maximize the performance of a computer system, but a technique proposed for memory management is insufficient.

Advantages and features of the described technology and methods of achieving the same will become apparent with reference to some embodiments described in detail together with the accompanying drawings. However, the described technology is not limited to the following embodiments and may be implemented in various forms. The embodiments are merely provided to completely disclose the described technology and to fully inform those skilled in the art about the scope of the described technology, and the described technology is defined by the appended claims.

Also, terms used herein are only for describing the embodiments while not limiting the described technology. Herein, the singular forms "a," "an," and "one" include the plural unless the context clearly indicates otherwise. Herein, the terms "comprises" and/or "comprising" are used to specify the presence of stated elements, steps, actions, and/or components, but do not preclude the presence or addition of one or more other elements, steps, actions, and/or components.

Hereinafter, embodiments of the described technology will be described in detail with reference to the accompanying drawings. At this time, detailed descriptions of well-known elements or functions will be omitted if the descriptions may obscure the gist of the described technology.

BASIC DESCRIPTION

Processing-In-Memory (PIM)

A processing-in-memory (PIM) is an intelligent semiconductor that is packaged by integrating a memory and a processing unit into a single chip. Using a PIM can maximize the performance of a computer system by eliminating the memory bottleneck of traditional computers. Various memories may be used as the memory for PIM, and the described technology relates to a PIM that uses dynamic random access memory (DRAM) as an internal memory.

Figure 1:
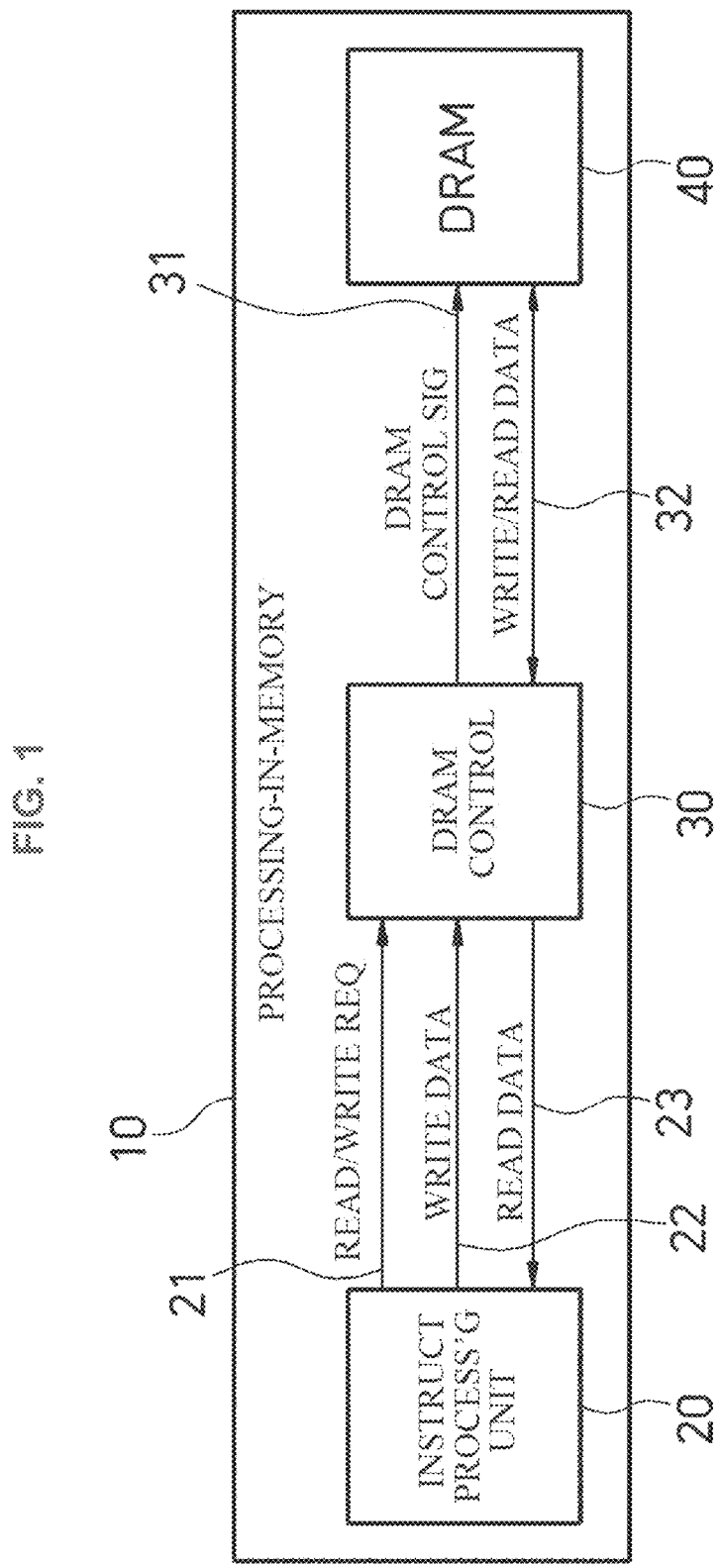
FIG. 1 is an internal structure diagram of a processing-in-memory (PIM).

FIG. 1 is a diagram showing an internal structure of a PIM. As shown in FIG. 1, an instruction processing unit (or an instruction processor) 20 inside a PIM 10 sends a read and write request 21 to a DRAM controller 30 in order to access a DRAM 40. Specifically, the instruction processing unit 20 sends a read/write request signal 21 to the DRAM controller 30. In the case of a write request, the instruction processing unit 20 provides write data 22 to the DRAM controller 30 and receives read data 23 from the internal DRAM 40 through the DRAM controller 30. The DRAM controller 30 sends a control signal 31 to the DRAM 40 in order to transmit or receive write/read data 32 to or from the DRAM 40.

Page Policy for DRAM

Figure 2:
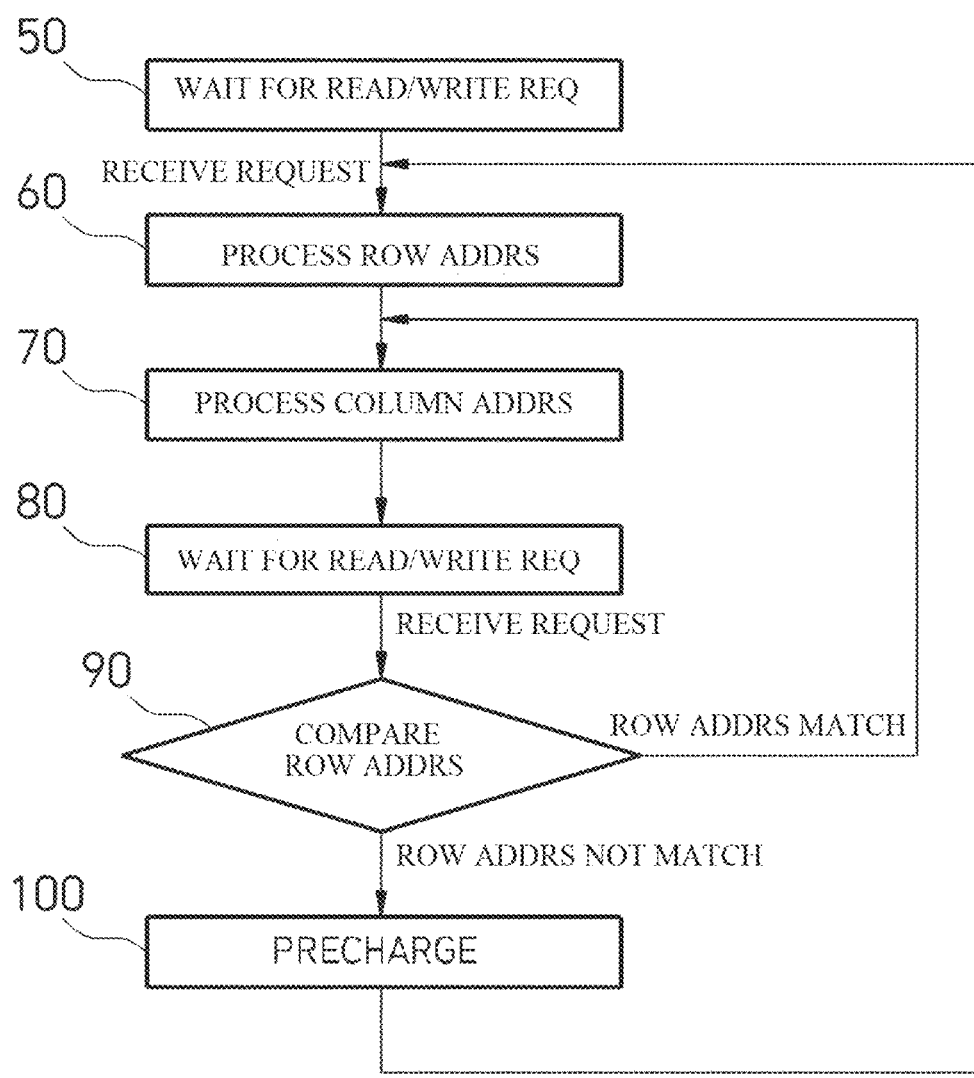
FIG. 2 is a flowchart of a dynamic random access memory (DRAM) open-page policy.

In order to write data in the DRAM or to read data from the DRAM, a requested address is divided into a row address and a column address to be sequentially processed. A precharge action is performed before processing the row address. Since the row-address processing and the precharge action take a long time, i.e., take up most of the response time of the DRAM, a conventional computer system mainly uses an open-page policy in which unnecessary row-address processing raid precharge action are omitted. As shown in FIG. 2, according to the open-page policy, a memory read/write request is waited for (50). A requested address is divided into a row address and a column address when the request is received. The row address is processed first (60), and then the column address is processed (70). Then, a subsequent read/write request is waited for (80). When the subsequent read/write request is received, the row address of the address processed for the previous request is compared to a row address of an address to be processed for this request (90). When the row addresses match, the row address processing 60 is skipped, and only the column address processing is processed (70). On the other hand, when the row address of the address to be processed does not match the row address of the address processed for the previous request, both of the precharge action (100) and the row address processing (60) should be performed.

PIM Instruction Packet

Figure 3:
FIG. 3 is an exemplary structure diagram of a PIM instruction packet.

A PIM performs an operation function other than a general read function and write function of a memory. Accordingly, a PIM and a computer system transmits and receives, for example, an instruction packet 110 that is configurable as shown in FIG. 3 in order to request and respond to the memory function and the operation function of the PIM. The instruction packet 110 may include an OPCODE, a destination address, and an operand address. The OPCODE designates the type of an operation to be performed by PIM, the destination address is a target address for writing back the operation result after the PIM performs the operation function, and the operand address is an address indicating an operand necessary for the operation. A method of designating the operand may include a method of directly designating the operand (immediate type) and a method of designating the address of the operand (recall type). Also, the method of designating the address of the operand includes a method of directly designating the address and a method of indirectly designating the address by designating the range of the address. These address designation methods may be variously used depending on the use and design of the PIM.

Figure 4:
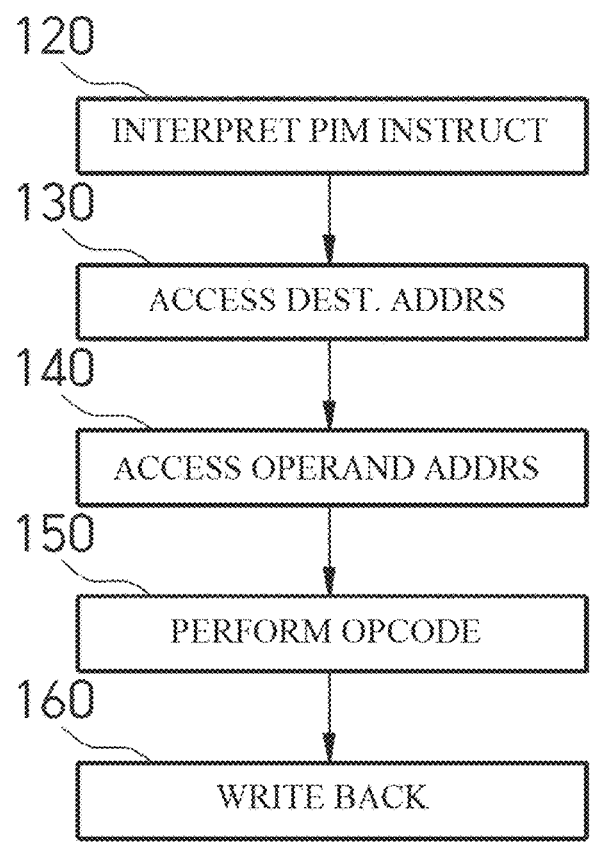
FIG. 4 is a flowchart of an instruction execution procedure of a PIM.

A process of processing the instruction packet in the PIM has an atomic operation in which a memory read and write function and an operation function are sequentially executed as shown m FIG. 4. That is, the PIM instruction processing unit 20 (see FIG. 1) interprets the received PIM instruction packet and sends a destination address access request 130 and an operand address access request 140 to the DRAM controller in order to process the received PIM instruction packet. Also, after performing an operation function designated by the OPCODE in the instruction packet 110 (150), the PIM instruction processing unit 20 requests the DRAM controller 30 (see FIG. 1) to allow the access to the destination address in order to write back the operation result (160).

The memory management method of the PIM according to the described technology includes the following two types of PIM instruction packet processing methods in order to improve the response speed and throughput of the PIM. Through this processing scheme, it is possible to improve a page hit rate when the DRAM inside the PIM uses the open-page policy.

(1) Secondary Request for Destination Address

Types of PIM instruction packets include an instruction packet in which tin operation to be performed should use, as an operand, data of a destination address as well as a source address. The PIM memory management method according to the described technology includes a scheme of accessing the source address first and then accessing the destination address when the instruction processing unit 230 (see FIG. 6) processes an instruction packet in which the data of the destination address should be used as an operand.

Figure 5:
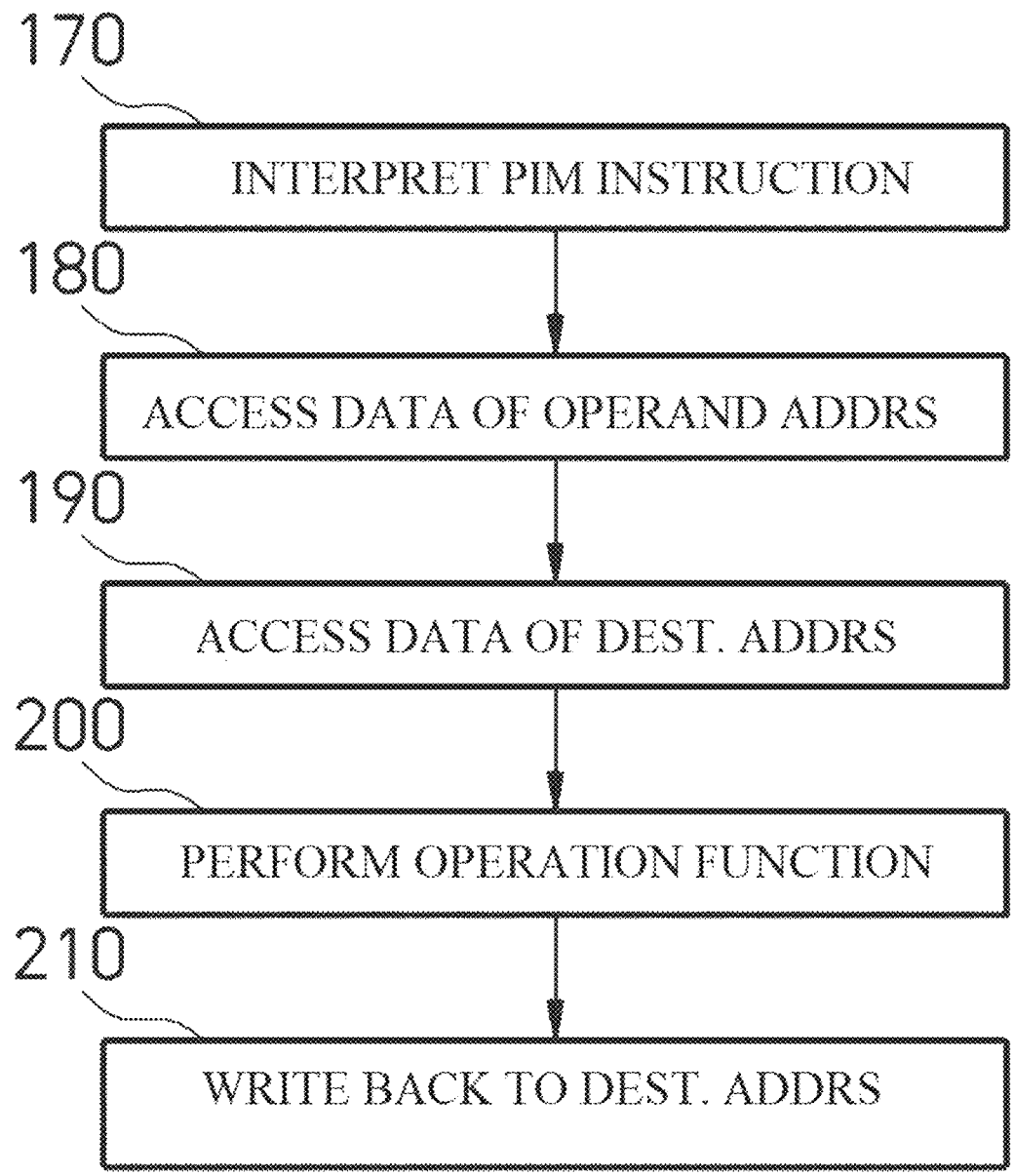
FIG. 5 is a processing flowchart of a PIM instruction packet according to an embodiment of the described technology.
Figure 6:
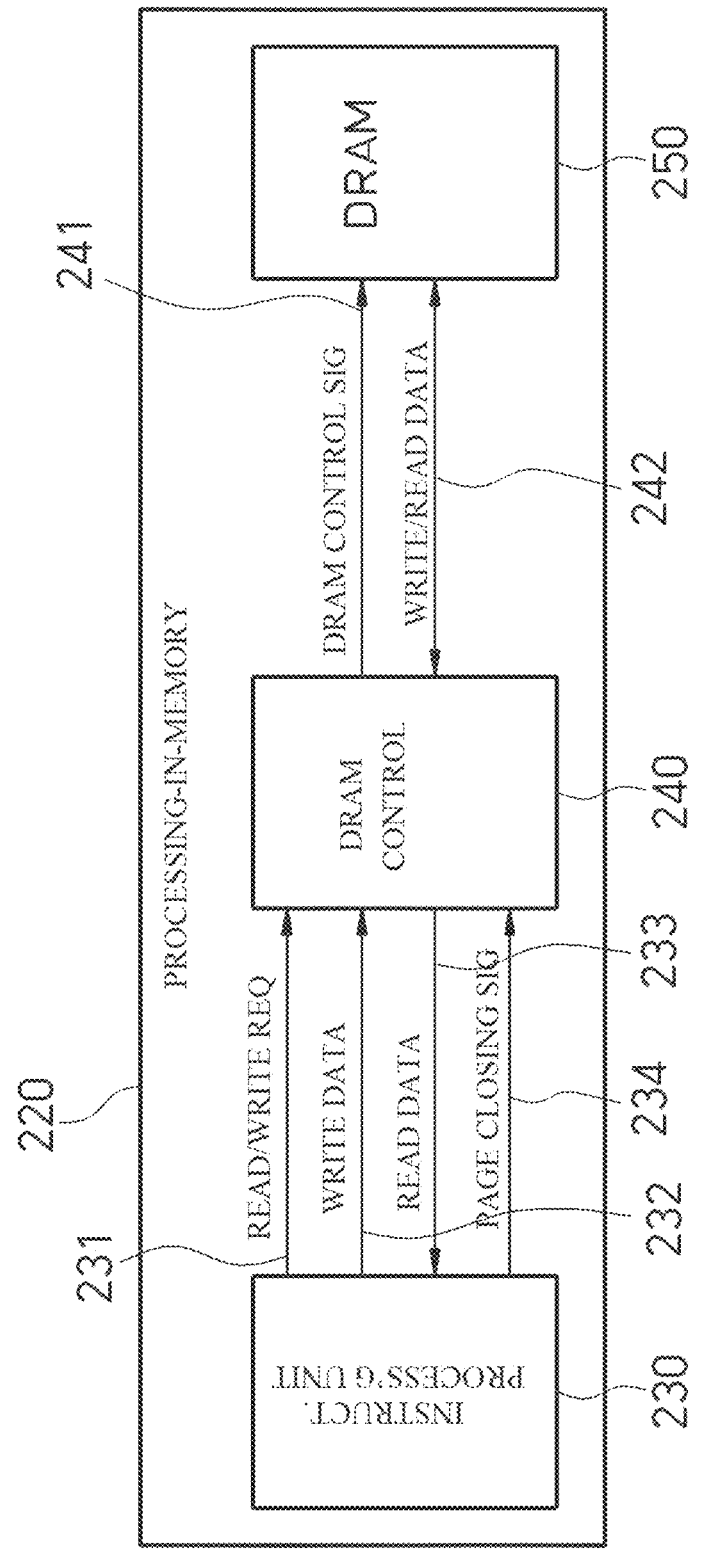
FIG. 6 is a structure diagram of a PIM according to the described technology.
Figure 8:
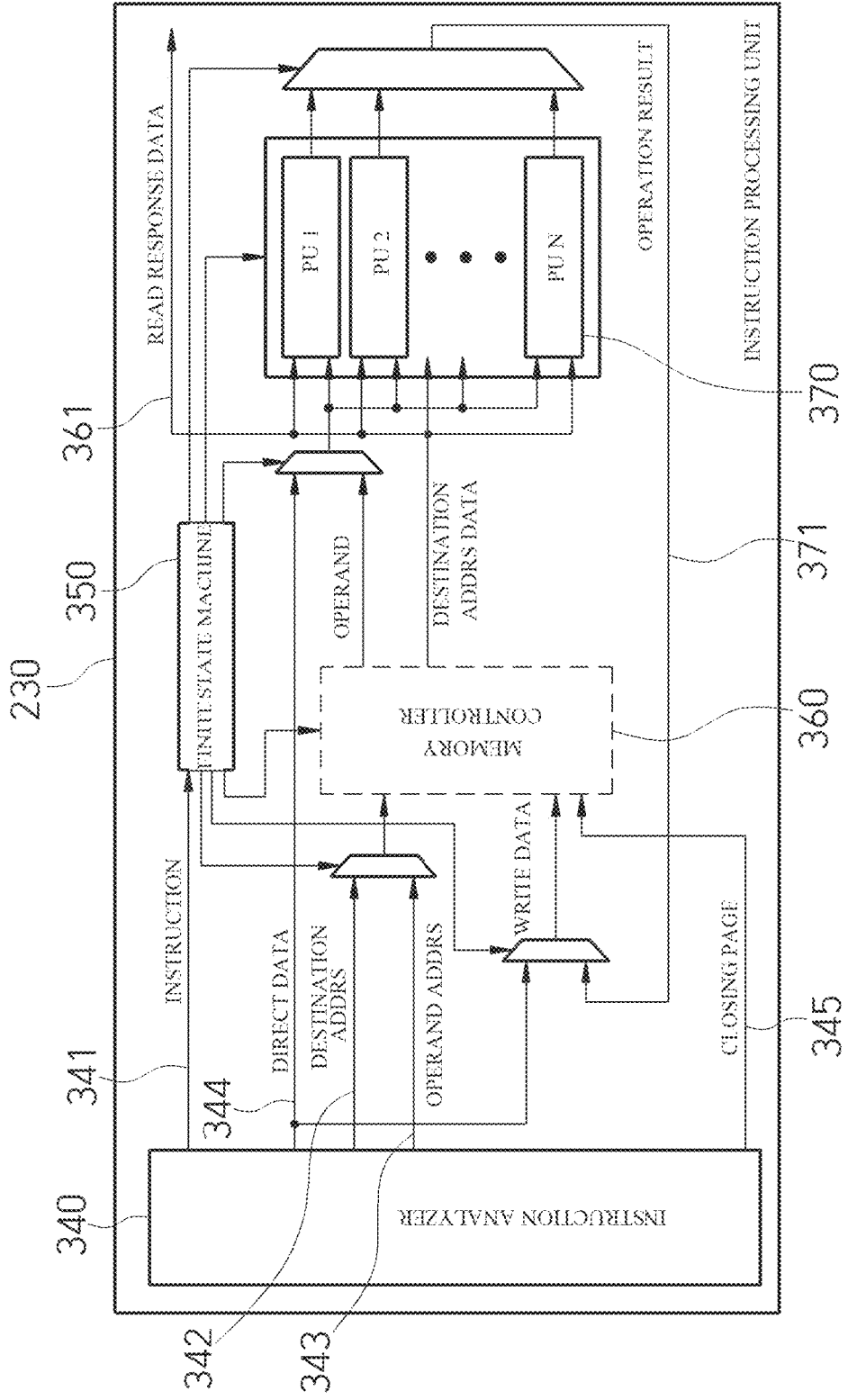
FIG. 8 is a structure diagram of an instruction processing unit of a PIM according to the described technology.

FIG. 5 is a processing flowchart of a PIM instruction packet according to the described technology. This will be described with reference to the PIM structure shown in FIG. 6 and the structure of die instruction processing unit 230 shown in FIG. 8. FIGS. 6 and 8 will be described below in detail.

Referring to FIG. 5, the PIM instruction processing unit 230 (see FIG. 6) interprets the PIM instruction packet (170), sends a request for access to operand address data to the DRAM controller in order to process the PIM instruction packet (180), and then performs a request for access to destination address data (190). After performing an operation function designated by the instruction packet (200), the PIM instruction processing unit requests the DRAM controller 30 (see FIG. 1) to allow the access to the destination address in order to write back the operation result (210).

This method proposed by the described technology matches a row address of an open page of the internal DRAM 250 (see FIG. 6) and a row address to which a PIM instruction packet processing result is written back by secondarily requesting the destination address and continuously performing destination address access (190) for the operand data and destination address access (210) for the write-back of the operation result. Accordingly, the page hit rate of the DRAM is improved.

(2) Page Closing Signal

The PIM structure diagram of FIG. 6 shows a page closing signal 234 used between the instruction processing unit 230 of the PIM 220 and the memory controller, that is, the DRAM controller 240. The instruction processing unit 230 inside the PIM stores (maintains) memory (DRAM) read and write addresses that have been previously requested (231) when the PIM instruction packet is processed. Also, when a subsequent PIM instruction packet is interpreted, the instruction processing unit 230 compares an address of a packet to be processed to the previous address that is stored (maintained) and informs the DRAM controller 240 of the comparison result (i.e., whether to close the open page of the DRAM 250) through the page closing signal 234.

The other actions of FIG. 6 are the same as described in FIG. 1. That is, the instruction processing unit 230 sends a read/write request 231 to the DRAM controller 240. In the case of a write request, the instruction processing unit 230 provides write data 232 to the DRAM controller 240 and receives read data 233 from the internal DRAM 250 through the DRAM controller 240. The DRAM controller 240 sends a control signal 241 to the DRAM 250 in order to transmit or receive write/read data 242 to or from the DRAM 250.

Figure 7:
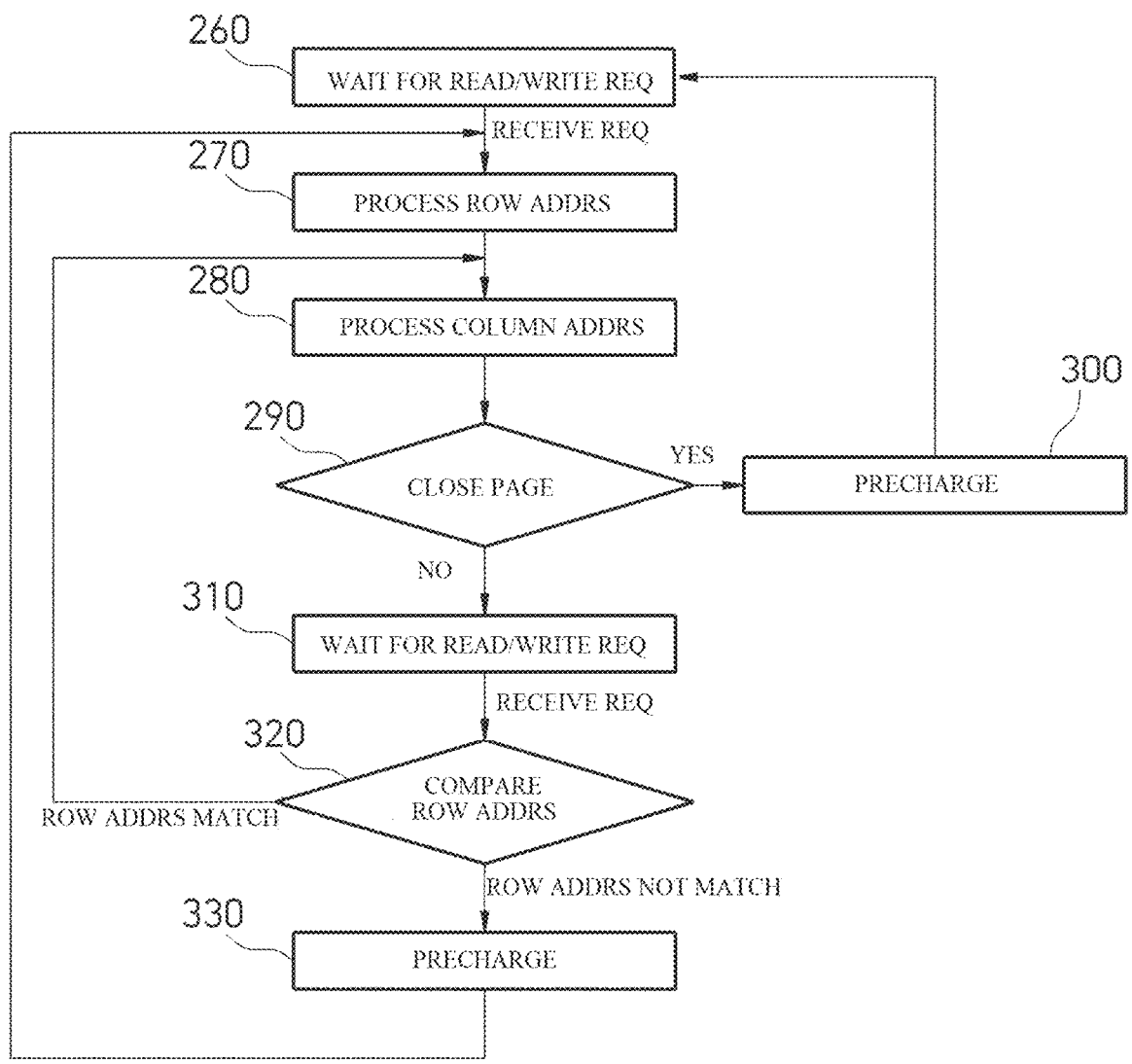
FIG. 7 is a flowchart for the operation of a DRAM controller inside a PIM according to another embodiment of the described technology.

FIG. 7 is a flowchart of the operation of the DRAM controller 240 inside the PIM when the page closing signal 234 is added as described above. The DRAM controller 240 waits for a memory read/write request (260), divides a requested address into a row address and a column address when the request is received, processes the row address (270), and processes the column address (280). Also, the DRAM controller 240 determines whether to maintain or close the page of the internal DRAM according to the page closing signal 234 (290). When the page closing signal is received, the DRAM controller 240 performs the precharge action 300, waits for a memory read/write request (260), and waits a subsequent read/write request when the page closing signal is not received (310). When the subsequent read/write request is received, the DRAM controller 240 compares the row address of the address processed for the previous request to a row address of an address to be processed for this request (320). When the row addresses match, the DRAM controller 240 skips the row address processing 270 and processes only the column address processing (280). On the other hand, when the row address of the address to be processed does not match the row address of the address processed for the previous request, both of the precharge action 330 and the row address processing 270 are performed.

In this way, unlike the conventional DRAM controllers using open-page policy, the DRAM controller 240 determines whether to maintain the page according to the page closing signal 234 of the instruction processing unit 230 after the column-address processing 280. According to this method, it is possible to reduce performance loss by performing, in advance, a precharge action performed by conventional DRAM controller upon page mismatching.

FIG. 8 is a diagram showing the structure of the instruction processing unit 230 that performs the memory management method of the PIM. The flowcharts of FIGS. 5 and 7 may be implemented by a finite state machine 350 of FIG. 8. A memory controller 360 of FIG. 8 may be outside or inside the instruction processing unit 230, but for convenience of description, the memory controller 360 is shown inside the instruction processing unit 230 in dotted lines. A processing unit 370 may be implemented with one or more processing units 1 to N depending on the type of a processable instruction.

An instruction analyzer 340 analyzes a PIM instruction packet to extract an instruction 341 and a destination address 342 and extract an operand address 343 or direct data 344 depending on the type of instruction.

When the instruction 341 to be processed is a memory write instruction, the finite state machine 350 performs a memory write action using the direct data 344 as write data. When the instruction 341 to be performed is a memory read, the finite state machine 350 requests data of the destination address from the memory controller 360 find transmits the requested data as read response data 361.

In the case of an operation instruction (I-type) using direct data the finite state machine 350 requests an operand from the destination address 342, delivers the operand to the processing unit 370 along with die direct data 344, and writes the operation result 371 back to the destination address 342. On the other hand, in the case of an operation instruction (R-type) using an operand address, the finite state machine 350 first requests an operand address 343 from die memory controller 360 and then requests data of the destination address 342. Also, the finite state machine 350 delivers collected operands to the processing unit 370 and writes the operation result back to the destination address 342.

While analyzing die PIM instruction packet, the instruction analyzer 340 compares the destination address of the previous instruction to the operand address of the current instruction to inspect whether the row addresses match (see FIG. 7). When the row addresses do not match, the instruction analyzer 340 generates a page closing signal 345 and delivers the page closing signal 345 to the memory controller 360 so that the precharge action of the internal DRAM can be performed in advance. That is, the memory controller 360 determines whether to maintain or close the page of the integral DRAM through the page closing signal 345.

The described technology has been described in detail with reference to some embodiments, but those skilled in the art can understand that the described technology may be carried out in specific forms different from those described herein without changing the technical spirit or essential features of the described technology. Therefore, the above-described embodiments are to be regarded as illustrative rather than restrictive. Also, the scope of the described technology is defined not by the detailed description but by the appended claims, and all changes or modifications derived from the claims and their equivalents will be construed as being included in the technical scope of the described technology.

What is claimed is:

1. A memory management method of a processing-in-memory including an instruction processor, a memory controller, and a memory, the method comprising:
   requesting, by the instruction processor, an address from the memory controller in order to process an instruction packet;

maintaining the requested address by the instruction processor, comparing, by the instruction processor, an address of a current instruction packet to be processed to a maintained address of a previous instruction packet when a subsequent instruction packet is processed; and generating, by the instruction processor, a page closing signal and delivering the page closing signal to the memory controller so that a precharge action of the memory is performed when a comparison result is that the addresses do not match.

2. The memory management method of claim 1, further comprising:

closing, by the memory controller, a page of the memory and performing the precharge action when receiving the page closing signal from the instruction processor.

3. The memory management method of claim 1, wherein:

the address requested from the memory controller in order for the instruction processor to process the instruction packet is a destination address for memory read and write, and when the instruction processor compares the address of the current instruction packet to be performed to the maintained address of the previous instruction packet, the address of the previous instruction packet is a destination address, and the address of the current instruction packet is an operand address.

4. The memory management method of claim 1, wherein generating the page closing signal and delivering the page closing signal to the memory controller are performed by an instruction analyzer included in the instruction processor.

* * * * *

UNITED STATES PATENT AND TRADEMARK OFFICE
CERTIFICATE OF CORRECTION

PATENT NO. : 11,347,504 B2
APPLICATION NO. : 17/137003
DATED : May 31, 2022
INVENTOR(S) : Byung Soo Kim et al.

It is certified that error appears in the above-identified patent and that said Letters Patent is hereby corrected as shown below:

In the Specification

In Column 1, Line 24, delete "Technologies" and insert -- Technology --.

In Column 1, Line 29, delete "operations" and insert -- operations. --.

In Column 1, Line 31, delete "tout" and insert -- unit --.

In Column 1, Line 32, delete "tut" and insert -- an --.

In Column 1, Line 38, delete "operations, for" and insert -- operations. For --.

In Column 2, Line 1, delete "base" and insert -- have --.

In Column 2, Line 47, delete "vanes" and insert -- varies --.

In Column 3, Line 51, delete "raid" and insert -- and --.

In Column 4, Line 26, delete "m" and insert -- in --.

In Column 4, Line 46, delete "tin" and insert -- an --.

In Column 4, Line 57, delete "die" and insert -- the --.

In Column 6, Line 21, delete "find" and insert -- and --.

In Column 6, Line 24, delete "data" and insert -- data, --.

In Column 6, Line 26, delete "die" and insert -- the --.

Signed and Sealed this
Third Day of January, 2023

Katherine Kelly Vidal
*Director of the United States Patent and Trademark Office*

CERTIFICATE OF CORRECTION (continued)
U.S. Pat. No. 11,347,504 B2

In Column 6, Line 30, delete "die" and insert -- the --.

In Column 6, Line 36, delete "die" and insert -- the --.

In the Claims

In Column 7, Lines 1-2, Claim 1, delete "processor," and insert -- processor; --.